United States Patent

Ikuta et al.

[11] Patent Number: 5,852,798
[45] Date of Patent: Dec. 22, 1998

[54] MACHINE TRANSLATION APPARATUS AND METHOD FOR TRANSLATING RECEIVED DATA DURING DATA COMMUNICATION

[75] Inventors: Junzo Ikuta; Hitomi Kinoshita; Kazutoshi Kurita, all of Fukuoka, Japan

[73] Assignee: Matsushita Electric Industrial Co., Ltd.

[21] Appl. No.: 671,577

[22] Filed: Jun. 28, 1996

[30] Foreign Application Priority Data

Aug. 8, 1995 [JP] Japan ................................. 7-233157

[51] Int. Cl.6 ................................................ G06F 17/28
[52] U.S. Cl. ................................................ 704/2
[58] Field of Search ...................................... 704/1–8

[56] References Cited

U.S. PATENT DOCUMENTS

| | | | |
|---|---|---|---|
| 4,953,088 | 8/1990 | Suzuki et al. | 704/2 |
| 5,005,127 | 4/1991 | Kugomiya et al. | 704/2 |
| 5,075,850 | 12/1991 | Asahioka et al. | 702/2 |
| 5,268,839 | 12/1993 | Kaji | 704/3 |
| 5,295,068 | 3/1994 | Nishino et al. | 704/2 |
| 5,351,189 | 9/1994 | Doi et al. | 704/2 |
| 5,497,319 | 3/1996 | Chong et al. | 704/2 |
| 5,612,872 | 3/1997 | Fujita | 704/5 |
| 5,715,466 | 2/1998 | Flanagan et al. | 704/3 |

*Primary Examiner*—Richemond Dorvil
*Assistant Examiner*—Patrick N. Edouard
*Attorney, Agent, or Firm*—Stevens, Davis, Miller & Mosher, L.L.P.

[57] ABSTRACT

A machine translation apparatus comprises a reception unit for receiving original text data, a first storage unit for storing the original text data received by the reception unit, a display unit for displaying the original text data in the first storage unit, a translation unit for sequentially translating the original text data received by the reception unit for each sentence, a second storage unit for storing translated data derived from the translation by the translation unit and a control unit for allowing the display unit to display the translated text data corresponding to the original text data when the translated text data is stored in the second storage unit while the original text data is displayed on the display unit. A machine translation method comprises the steps of receiving original text data, displaying the received original text data, sequentially translating the received original text data for each sentence, and sequentially displaying the translation result.

10 Claims, 5 Drawing Sheets

FIG.4

| | | |
|---|---|---|
| 1 | News from us. | |
| 2 | The newest version of the | |

FIG.5

| | | |
|---|---|---|
| 1 | News from us. | 私達からのニュース |
| 2 | The newest version of the | |

FIG.6

| | | |
|---|---|---|
| 1 | News from us. | 私達からのニュース |
| 2 | The newest version of the program is now available. | |
| 3 | Please enjoy o | |

FIG.7

| 1 | News from us. | 私達からのニュース |
| --- | --- | --- |
| 2 | The newest version of the program is now available. | プログラムの最新のバージョンが今使用できます。 |
| 3 | Please enjoy o | |

FIG.8

| 1 | News from us. | 私達からのニュース |
| --- | --- | --- |
| 2 | The newest version of the program is now available. | プログラムの最新のバージョンが今使用できます。 |
| 3 | Please enjoy our new features. | 私達の新しい特徴をどうぞ楽しんでください。 |
| | • | |
| | • | |
| | • | |
| | • | |
| | • | |
| 48 | For more information contact us. | より多くの情報のために、私達とコンタクトしてください。 |

FIG.9
PRIOR ART

| 1 | News from us. |
|---|---|
| 2 | The newest version of the program is now available. |
| 3 | Please enjoy our new features. |
| | • |
| | • |
| | • |
| | • |
| | • |
| 48 | For more information contact us. |

ND METHOD FOR TRANSLATING RECEIVED
MACHINE TRANSLATION APPARATUS AND METHOD FOR TRANSLATING RECEIVED DATA DURING DATA COMMUNICATION

BACKGROUND OF THE INVENTION

The present invention relates to a machine translation apparatus and a machine translation method for translating a text of a language derived by data communication utilizing data communication to a text of a different language.

As the application of personal computer communication and internet recently expands, an opportunity to face an overseas document by data communication is increasing. Further, in database retrieval, an environment to directly access overseas text data has been established. However, since the overseas text data is described in an unpracticed foreign language, substantial efforts are needed for many users to directly read the text which is not in a mother tongue.

A prior art machine translation machine is now described. In the prior art machine translation apparatus, since an input text is translated to a practiced language, a read time of the text may be shortened. However, since the prior art machine translation apparatus is independent and separate from a data communication unit, the translation cannot be conducted during the data communication. Accordingly, during the communication, only the data in the original language used in the data communication may be referred and the text is inputted to the machine translation apparatus and translated thereby after the text has been acquired by communication software. FIG. 9 shows a display in English on a display device immediately after English data 48 has been received by the prior art machine translation apparatus. Thus, in the prior art machine translation apparatus, the translation is conducted after all data have been received and, during the data reception, the translation cannot be conducted in spite of the presence of an English text to be translated in the apparatus.

SUMMARY OF THE INVENTION

It is an object of the present invention to provide a machine translation apparatus and a machine translation method which solve the problems encountered in the prior art apparatus and which can read a translated text in a course of data communication.

The present invention provides a machine translation apparatus comprising: reception unit for receiving original text data, first storage unit for storing the original text data received by the reception unit, display unit for displaying the original text data in the first storage unit, translation unit for sequentially translating the original text data received by the reception unit for each sentence, second storage unit for storing translated data derived from the translation by the translation unit, and control unit for allowing the display unit to display the translated text data corresponding to the original text data when the translated text data is stored in the second storage unit while the original text data is displayed on the display unit.

The present invention further provides a machine translation method comprising the steps of receiving original text data, displaying the received original text data, sequentially translating the received original text data for each sentence, and sequentially displaying the translation result.

BRIEF DESCRIPTION OF THE DRAWINGS

FIG. 4 shows a chart of display data on a display screen in the embodiment, FIG. 5 shows a chart of display data on the display screen in the embodiment, FIG. 6 shows a chart of display data on the display screen in the embodiment, FIG. 7 shows a chart of display data on the display screen in the embodiment, FIG. 8 shows a chart of display data on the display screen in the embodiment, and FIG. 9 shows a chart of a display on display unit of a prior art machine translation apparatus.

DETAILED DESCRIPTION OF THE PREFERRED EMBODIMENTS

An embodiment of a machine translation apparatus of the present invention is now explained.

Figure 1:
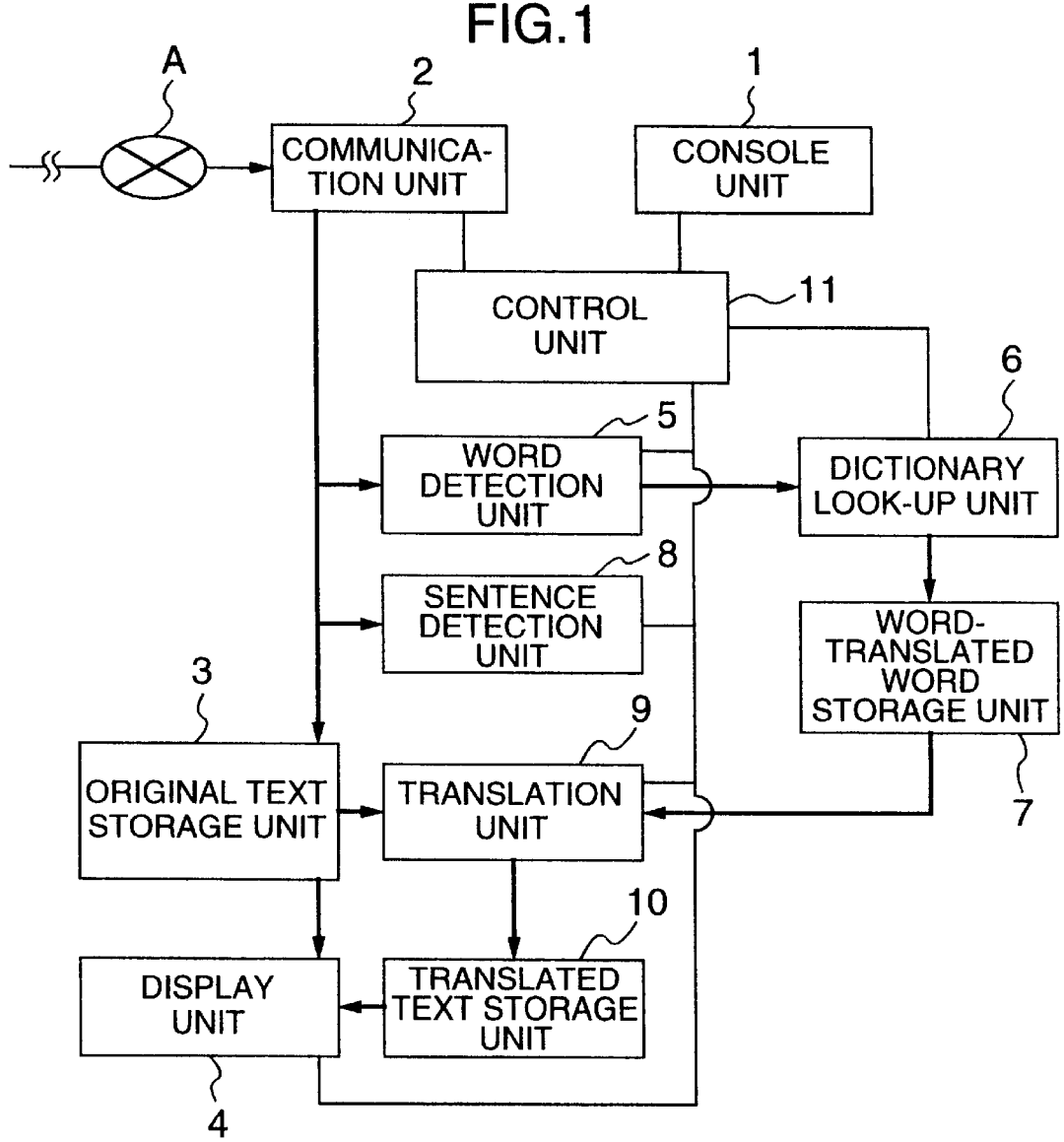
FIG. 1 shows a block diagram of an embodiment of machine translation apparatus and method of the present invention.

FIG. 1 shows a functional block diagram illustrating a function of the machine translation apparatus in the present embodiment. In the present embodiment, an English-to-Japanese machine translation apparatus in which an original language is English and a translated language is Japanese is illustrated.

In FIG. 1, symbol A denotes a telephone line, numeral 1 denotes a console unit for entering a command to the entire apparatus, and numeral 2 denotes a communication unit for transmitting and receiving data over the telephone line A. In the present embodiment, the communication unit 2 receives 40 characters in one reception although the number of received characters may be changed by control unit 11 to be described later by a command from the console unit 1.

Numeral 3 denotes an original text storage unit for serially storing original text data received from the communication unit 2 and numeral 4 denotes a display unit for serially displaying the original text data stored in the original text storage unit 3 in the order of storage and also displaying a translated text stored in translated text storage unit 10 to be described later.

Numeral 5 denotes a word detection unit including a word dictionary for detecting a word having alphabetic characters linked supplied from the communication unit 2, numeral 6 denotes a dictionary look-up unit for looking up for the word when the word detection unit 5 detects the word, numeral 7 denotes a word-translated word storage unit for storing words and the translated words, in pairs, which are derived by the dictionary look-up process by the dictionary look-up unit 6, numeral 8 denotes a sentence detection unit for detecting the reception of a sentence in the original alphabetic text data serially supplied from the communication unit 2 and numeral 9 a denotes translation unit including a syntax dictionary for translating a text in one language to other language, which conducts a substantial translation process with various analyses by data relating to the original text stored in the original text storage unit and the translated words stored in the translated word storage unit 7. Numeral 10 denotes a translated text storage unit for storing a translated text which is the result of translation by the translation unit 9, and numeral 11 denotes a control unit for controlling operation of the above units.

Figure 2:
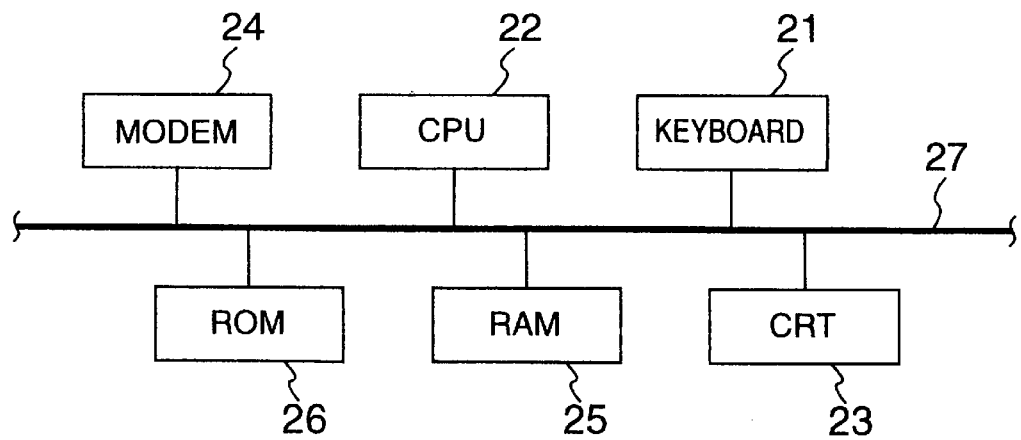
FIG. 2 shows a block diagram which implements the embodiment.
Figure 3:
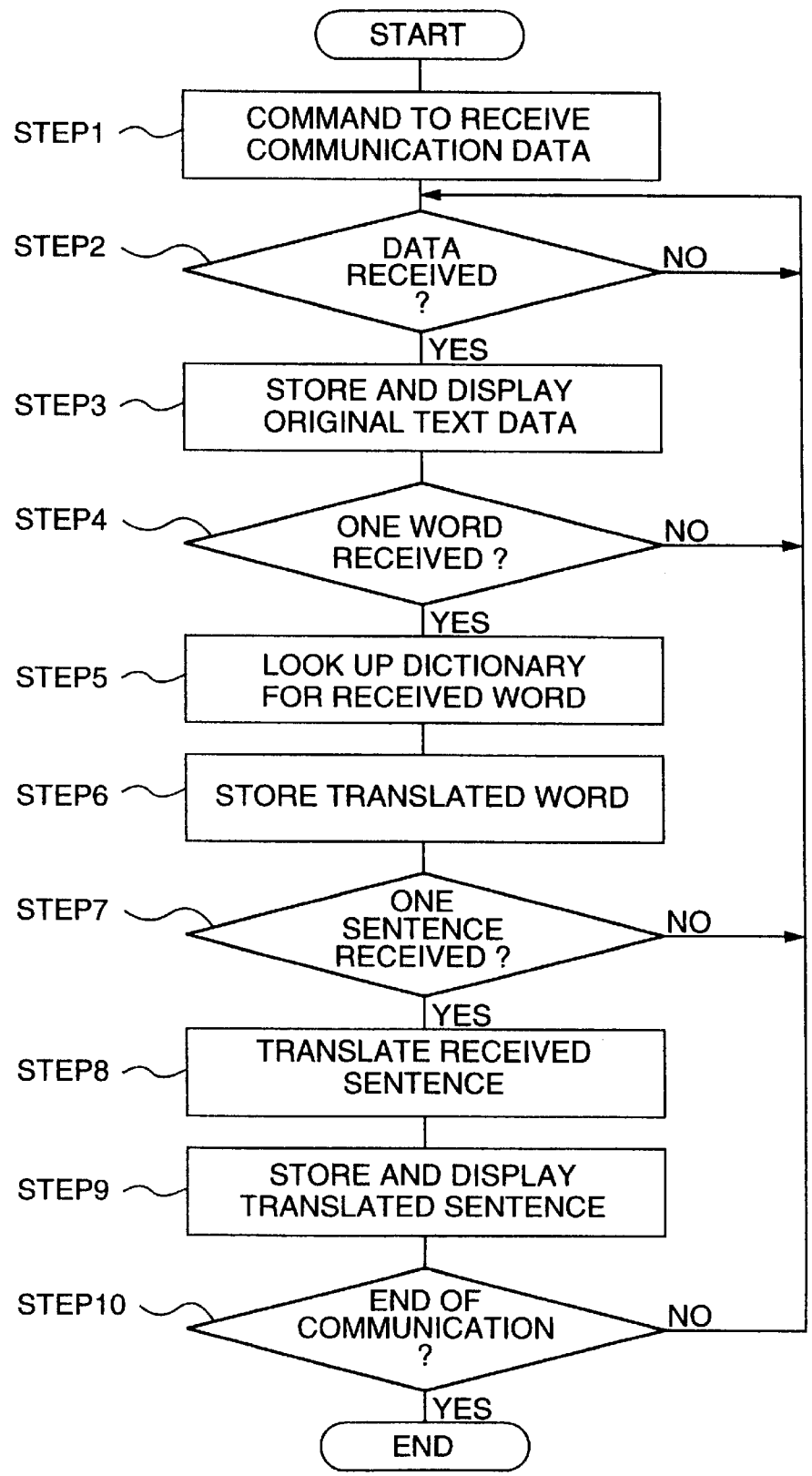
FIG. 3 shows a flow chart of an operation of the embodiment.

FIG. 2 shows a circuit block diagram of the functional configuration of the present embodiment.

In FIG. 2, numeral 21 denotes a keyboard which implements the console unit 1, numeral 22 denotes a CPU (central processing unit) which implements the control unit 11, numeral 23 denotes a CRT which implements the display unit 4, numeral 24 denotes a modem device which implements the communication unit 2 for conducting the communication with external over the communication line, numeral 25 denotes a data readable and writable RAM which implements the original text storage unit 3, the translated word storage unit 7 and the translated text storage unit 10, numeral 26 denotes a data readable ROM which stores a program having functions of the above units, the word dictionary and the syntax dictionary, and numeral 27 denotes a bus for coupling the above units.

An operation of the machine translation apparatus of the present invention is now explained with reference to a flow chart which illustrates the operation of the embodiment.

First, the reception of the original text data is commanded from the console unit 1 (step 1). In response to the command from the console unit 1, the communication unit 2 starts the reception of the original text data. In the present embodiment, the apparatus is set to receive 40 characters (predetermined character unit) at a time for the English text.

Then, the communication unit 2 determines whether data has been received or not (step 2). If the communication unit determines that the original text data has not been received, the process returns to the step 2 to wait for the reception of the original text data. Namely, data reception stand-by state is initiated.

If the communication unit 2 determines that the original text data has been received, the communication unit 2 transmits the received data to the original text storage unit 3, stores it therein and the displayed original text data is displayed on the display unit 4 (step 3). The display unit 4 always displays the contents of the information stored in the original text storage unit 3 and the translated text storage unit 10 and FIG. 4 shows a display status of the display unit 4 immediately after the reception of the original text data of the communication unit 2. FIG. 4 shows that the entire first sentence received is stored in the original text storage unit 3 and a portion of the second sentence is stored.

As the transmission occurs, the word detection unit 5 operates to detect a word having alphabetic characters which are supplied from the communication unit 2 sequentially received and linked to a word (step 4). When the word detection unit 5 does not detect the word, the process returns to the step 2 and waits for the reception of missing characters of the word.

Then, whenever the word detection unit 5 detects a word, it transmits the word to the dictionary look-up unit 6 which looks up the dictionary for the word (step 5) and the word and the translated word are transmitted to the word-translated word storage unit 7 and stored therein (step 6).

In step 7, the sentence detection unit 8 is operated to detect the reception of a sentence in the original text data of the alphabetic characters sequentially supplied from the communication unit 2. In step 8, as the sentence detection unit 8 detects the sentence, the translation unit 9 translates the original text stored in the original text storage unit 3 by the syntax dictionary stored in the translation unit 9 and the translated word information stored in the word-translated word storage unit 7 (step 8). When the sentence detection unit 8 does not receive one sentence of original text data, the process returns to the step 2 to receive the reception.

The translated text which is the result of translation is sequentially stored in the translated text storage unit 10 and also arranged and displayed on the display screen of the display unit 4 in association with the original text (step 9).

FIG. 5 shows a chart of display data on the display unit after the translation of the first sentence. The first sentence has been translated and stored in the translated text storage unit 10 and the English text and the Japanese text of the first sentence and a portion of the second sentence are displayed on the display unit 4. As described above, the display unit 4 always displays the both text data stored in the original text storage unit 3 and the translated text storage unit 10.

Mutual information of display coordinates is stored in the original text storage unit 3 and the translated text storage unit 10 so that the original text and the translated text may be displayed on the screen in mutual association.

In step 10, the communication unit 2 determines whether the entire data communication has been completed or not. If the entire reception has been completed, the operation of the apparatus is terminated and if the entire reception has not been completed, the process returns to the step 2 to repeat the above steps.

FIG. 6 shows display data on the display screen of the display unit immediately after the second data reception. FIG. 7 shows display data on the display screen of the display unit 4 at the time of completion of the translation of the second sentence. FIG. 8 shows display data on the display screen of the display unit 4 when the original text data has been additionally received and the translation of the entire original text data has been completed.

In this manner, the data reception process from the reception to the display and the translation process of the translation of the received original text are sequentially conducted until the entire original data is received to proceed the entire process.

While the English-to-Japanese translation has been described in the present embodiment, the present invention is not limited thereto but it is equally applicable to Japanese-to-English, German-to-Japanese or Chinese-to-Thailand translation. The data reception may be implemented by an interrupt process to improve the translation efficiency.

In accordance with the present embodiment, since the text data is sequentially received, the received text data is sequentially translated and the texts before translation and after translation are displayed, the translation process need not be waited until the completion of the data communication and the translated text may be read in the course of data communication.

Further, while the dictionary look-up is conducted before the reception of the entire sentence in the present embodiment, it may be substituted by syntax analysis, semantics analysis or simple word/phrase analysis.

The translation method attained by the present embodiment may be implemented by loading or storing a program stored in a storage medium such as a floppy disk to a personal computer and operating the personal computer.

What is claimed is:

1. A machine translation apparatus which receives and translates original text data including a plurality of sentences, said apparatus comprising:

reception means for receiving the original text data;

display means for displaying the original text data;

translation means for receiving the original text data from said reception means and translating a predetermined unit of said plurality of sentences of the original text data prior to completion of reception of the original text data by said reception means; and control means for allowing said display means to display a translation result of said predetermined unit of said plurality of sentences of the original text data prior to completion of reception of said original text data.

2. An apparatus as in claim 1, wherein, each time an amount of received original text data that have not yet been translated reaches said predetermined unit, said translation means translates said predetermined unit of said plurality of sentences.

3. A machine translation apparatus which receives and translates original text data including a plurality of sentences, said apparatus comprising:

reception means for receiving the original text data;

first storage means for storing the original text data received by said reception means;

display means for displaying the original text data stored in said first storage means;

translation means for receiving the original text data from said reception means and each time an amount of received original text data that have not yet been translated reaches a predetermined unit of said plurality of sentences, translating said predetermined unit of said plurality of sentences prior to completion of reception of said original text data by said reception means; and second storage means for storing translated data derived from the translation by said translation means; and control means for allowing said display means to display a translation result of said predetermined unit of said plurality of sentences of the original text data while the original text data is displayed on said display means.

4. A machine translation apparatus according to claim 3 wherein said control means allows said display means to display thereon the original text data and the translated text data in an associated relation.

5. A machine translation apparatus according to claim 3 further comprising:

word detection means for detecting a word for the original text data from said communication means; and dictionary look-up means for looking up a dictionary for the word when the word is detected by said word detection means to extract a translated word;

said translation means referring result of extraction by said dictionary look-up means when said translation means translates the original text data in said original text storage means.

6. A machine translation apparatus according to claim 3 wherein said reception means sets the number of characters to be received at a time.

7. A method for receiving and translating original text data including a plurality of sentences, said method comprising the steps of:

(a) receiving the original text data;

(b) translating a predetermined unit of said plurality of sentences of the received original text data prior to completion of reception of said original text data; and (c) displaying a result of translation of said predetermined unit of said plurality of sentences immediately after the completion of the translation in step (b).

8. A method for receiving and translating original text data including a plurality of sentences, said method comprising the steps of:

(a) receiving the original text data;

(b) displaying the received original text data;

(c) each time an amount of received original text data that have not vet been translated reaches a predetermined unit of said plurality of sentences, translating said predetermined unit of said plurality of sentences prior to completion of reception of said original text data in step (a); and (d) sequentially displaying translation results of step (c).

9. A method for receiving and translating original text data including a plurality of sentences, said method comprising the steps of:

(a) receiving the original text data;

(b) displaying the received original text data;

(c) detecting a word from the received original text data and accessing a dictionary to extract a translated word;

(d) each time an amount of received original text data that have not yet been translated reaches a predetermined unit of said plurality of sentences, translating said predetermined number of said plurality of sentences prior to completion of reception of said original text data in step (a) by referring to an extraction result from step (c); and (e) sequentially displaying translation results of step (d).

10. A storage medium storing a program for implementing the steps of:

(a) receiving original text data including a plurality of sentences;

(b) displaying the received original text data;

(c) each time an amount of received original text data that have not vet been translated reaches a predetermined unit of said plurality of sentences, translating said predetermined unit of said plurality of sentences prior to completion of reception of said original text data in step (a); and (d) sequentially displaying translation results from step (c).

* * * * *